United States Patent Office 3,045,534
Patented July 24, 1962

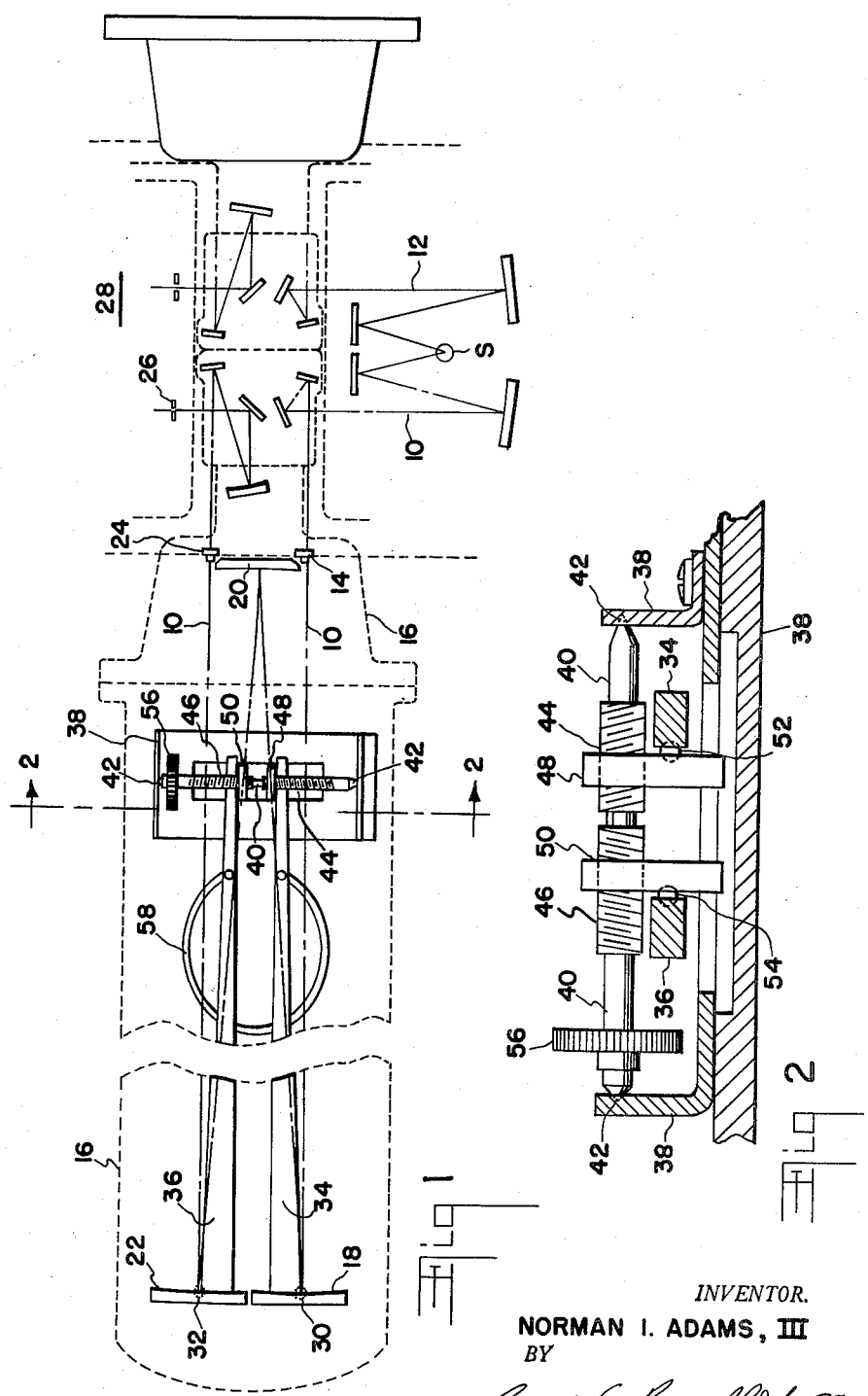

3,045,534
SPECTROSCOPY APPARATUS
Norman I. Adams III, Wilton, Conn., assignor to The Perkin-Elmer Corporation, Norwalk, Conn., a corporation of New York
Filed Mar. 24, 1959, Ser. No. 801,577
2 Claims. (Cl. 88—14)

This invention relates to infrared spectroscopy and, more particularly, to an improved long path cell for use in infrared spectrophotometers.

Infrared spectrophotometers are widely used for the analysis of chemical compounds. By measuring the absorption of infrared energy by a particular unknown at various wavelengths throughout the infrared spectrum, and comparing the results with known standards, the chemical make-up of the unknown sample may be determined. Both single and double beam spectrophotometers are employed for such measurements. When a double beam instrument is employed, one of the beams is passed through the sample and into a comparator, while a similar reference beam is passed directly into such comparator. The two beams are then compared to determine the difference in infrared energy contact, thereby providing a measure of the infrared energy absorbed by the sample.

It is often desirable to determine the chemical components which may be present in minute percentages in a gas volume. For example, it may be desired to measure the particular components present in a sample of atmospheric air for air pollution studies. In such cases the component of interest is present in the sample in such small concentrations as to make analysis difficult. In order to overcome such difficulties, "long path" cells are employed. Long path cells are normally considered to be attachments to standard instruments and comprise enclosed chambers having mirrors therein whereby the infrared beam may be "folded" to provide an effectively long path through the sample gas. Certain difficulties arise, however, from the actual operation of such devices and one of the most troublesome difficulties lies in the proper adjustment of the mirrors to provide a sample beam of the correct length. It is, therefore, the primary object of the present invention to provide a simple, easily-adjustable mirror adjusting apparatus for use in infrared spectrophotometers. Other objects, features, and advantages will be apparent from the following description, appended claims, and attached drawing.

The above objects are attained by providing mirror adjusting apparatus comprising in combination a first arm means having a pivot at one end and adapted to retain a first mirror substantially at its pivoted end, and a second arm means having a pivot at one end and adapted to retain a second mirror substantially at its pivoted end. The first and second arm means are rotatable about their pivots in a common plane. A first arm actuating means is provided in contacting relationship with the first arm means to move the first arm means in the common plane, and a second arm actuating means is provided in contacting relationship with the second arm means to move the second arm means in the common plane. Both arm actuating means are mounted on a common axis parallel to a line connecting the pivots of the first and second arm means. Means are provided for linearly moving the first and second arm actuating means in opposite directions along their common axis.

The apparatus of this invention will be better understood by reference to the two figures of the attached drawing wherein:

FIG. 1 is a plan view of the mirror adjusting apparatus of the invention; and

FIG. 2 is a cross-sectional elevational view taken along the line 2—2 of FIG. 1.

With reference to FIG. 1 an infrared source S in combination with the necessary mirrors provides a sample beam 10 and a reference beam 12. Sample beam 10 is focused by suitable mirrors through entrance window 14 of long path cell housing 16. Sample beam 10 strikes spherical mirror 18 and is reflected to spherical mirror 20. Spherical mirror 20 is fixed and focuses the incident ray on spherical mirror 22. From mirror 22 the beam passes to exit window 24. From exit window 24 the infrared sample beam is passed through a suitable mirror arrangement into entrance slit 26 of monochromator housing 28. As illustrated in FIG. 1 the length of passage of sample beam 10 through long path cell 16 is approximately four times the distance from the entrance slit 14 to the first mirror 18. This distance may be greatly expanded, however, by the precise and careful adjustment of mirrors 18 and 22. Mirrors 18 and 22 are positioned so that their reflective surfaces rotate about the points intercepted by parallel rays passing through windows 14 and 24. By pivoting mirror 18 about pivot 30 in a counter clockwise direction the infrared beam may be caused to strike mirror 20 at a point nearer window 24 than illustrated in the drawing. If mirror 22 is then rotated about pivot 32 in a clockwise direction, but in an amount exactly corresponding to the rotation of mirror 18, multiple traversals of cell 16 by sample beam 10 may be achieved while still focusing sample beam 10 near exit window 24. By such adjustment it has been found possible to increase the effective path length of the sample cell by a factor of as much as ten. The resulting improvement in accuracy of analyses will be apparent to those skilled in the art. The precise adjustment of mirrors 18 and 22 is achieved by mounting each mirror on a corresponding arm 34 and 36 which lies in a direction roughly parallel to the longitudinal axis of cell 16. At the extremities of the adjusting arms an adjusting mechanism is provided capable of imparting equal but opposite rotational motions to the adjusting arms. The adjusting apparatus comprises a suitable base and bracket assembly 38 supporting a shaft 40 at each end by means of suitable bearings 42. This construction will be more apparent from the illustration of FIG. 2. Shaft 40 is provided with a right-hand screw thread 44 at one end and a left-hand screw thread 46 at the other. Internally threaded first arm actuating means 48 and second arm actuating means 50 are provided on each threaded section of shaft 40. A ball bearing 52 is provided in suitable races between arm 34 and actuating means 48 to allow longitudinal movement of the actuating means in a direction parallel to the center line of cell 16. A similar bearing 54 is provided between arm 36 and actuating means 50. Actuating means 48 and 50 extend downward into the opening of base 38 to prevent their rotation about shaft 40. A suitable knurled knob 56 is mounted on shaft 40 to provide rotation thereof. A suitable spring 58 joins first and second arm means 34 and 36 and provides a continuous compressive loading force therebetween. It will be readily apparent that the rotation of knob 56 will cause arm actuating means 50 and 48 to move in opposite directions along the axis of shaft 40. As actuating means 48 and 50 move outward from one another, they will impart a spreading motion to arms 36 and 34 against the action of spring 58 so as to rotate mirror 18 about its pivot in a clockwise direction, and rotate mirror 22 an equal amount about its pivot in a counter clockwise direction. As knob 56 is moved to bring actuating means 48 and 50 nearer to each other, the spreading pressure on arms 34 and 36 will be released whereby spring 58 will return the arms to their original position and impart opposite rotational movements to each of mirrors 18 and 22.

While the illustrated embodiment of the apparatus of the invention shows knurled knob 56 located within cell housing 16, it will be readily apparent that an outside control could be provided. Similarly, other obvious modifications of the apparatus of this invention may be effected without departing from the scope and spirit thereof.

I claim:

1. Mirror adjusting apparatus for use in infrared spectrophotometers comprising in combination a first elongated arm means having a pivot at one end and adapted to retain a first mirror substantially at its pivoted end; a second elongated arm means having a pivot at one end and adapted to retain a second mirror substantially at its pivoted end, said first and second arm means being substantially parallel to one another and rotatable about their pivots in a common plane; first and second actuating means interposed between said first and second arm means and in respective contacting relationship with the unpivoted ends thereof to maintain the unpivoted ends of said first and second arm means in adjustable parted relationship with one another; right hand screw means in actuating relationship with said first actuating means; left hand screw means in actuating relationship with said second actuating means; means for rotating said right and left hand screws to concurrently move said first and second actuating means in opposite directions along a common axis parallel to a line connecting the pivots of said first and second arm means; and spring loading means on each of said arm means to move the unpivoted ends of said arm means together as the spreading force of said actuating means is removed.

2. Mirror adjusting apparatus for use in infrared spectrophotometers comprising in combination a first elongated arm means having a pivot at one end and adapted to retain a first mirror substantially at its pivoted end; a second elongated arm means having a pivot at one end and adapted to retain a second mirror substantially at its pivoted end, said first and second arm means being substantially parallel to one another and rotatable about their pivots in a common plane; first and second actuating means interposed between the unpivoted extremities of said first and second arm means and in respective contacting relationship therewith to maintain said unpivoted extremities in adjustable parted relationship with one another; right hand screw means in actuating relationship with said first actuating means; left hand screw means in actuating relationship with said second actuating means, said right and left hand screw means being portions of a common shaft; means for rotating said right and left hand screws to concurrently move said first and second actuating means in opposite directions along a common axis parallel to a line connecting the pivots of said first and second arm means; spring loading means on each of said arm means to move the unpivoted ends of said arm means together as the spreading force of said actuating means is removed; and bearing means between each of said actuating means and its associated arm means to allow movement of said actuating means along the length of said arm means.

References Cited in the file of this patent

UNITED STATES PATENTS

| | | |
|---|---|---|
| 2,104,552 | Blee et al. | Jan. 4, 1938 |
| 2,571,937 | Peck | Oct. 16, 1951 |
| 2,750,836 | Fastie | June 16, 1956 |
| 2,856,531 | Brouwer | Oct. 14, 1958 |

FOREIGN PATENTS

| | | |
|---|---|---|
| 503,167 | Great Britain | Apr. 3, 1939 |
| 713,288 | Great Britain | Aug. 11, 1954 |